United States Patent [19]
Ruck et al.

[11] Patent Number: 4,587,705
[45] Date of Patent: May 13, 1986

[54] METHOD OF JOINING A MOLDED FIRST PART TO A MATING PART CARRYING A FIRST THREAD MEMBER

[75] Inventors: George E. Ruck, Woodhaven; Michael H. Stefani, Livonia, both of Mich.

[73] Assignee: Ford Motor Company, Dearborn, Mich.

[21] Appl. No.: 670,108

[22] Filed: Nov. 9, 1984

[51] Int. Cl.⁴ ............................................. B23P 11/02
[52] U.S. Cl. ....................................... 29/450; 29/525; 29/526 R; 411/166; 411/177; 411/520; 403/406.1
[58] Field of Search ...................... 29/526 R, 450, 453, 29/525; 411/166, 172, 173, 174, 175, 111–113, 177, 183, 427, 437, 520, 525–528, 970; 403/406.1

[56] References Cited

U.S. PATENT DOCUMENTS

| | | | |
|---|---|---|---|
| 2,293,399 | 8/1942 | Moecker, Jr. et al. | 403/406.1 X |
| 2,716,434 | 8/1955 | Crowther | 411/174 X |
| 2,767,951 | 10/1956 | Cousino | 411/166 X |
| 3,100,517 | 8/1963 | Phillips | 411/166 |
| 3,135,309 | 6/1964 | Saltsik | 29/526 R UX |
| 3,297,072 | 1/1967 | Galer | 411/177 |
| 3,314,465 | 4/1967 | Bien | 29/453 X |
| 3,342,237 | 9/1967 | Meehan | 411/166 |
| 4,109,693 | 8/1978 | Paskert | 411/166 |
| 4,286,642 | 9/1981 | Keatley | 403/406.1 X |

FOREIGN PATENT DOCUMENTS 31009 12/1969 Japan ................................. 411/177

Primary Examiner—Charlie T. Moon
Attorney, Agent, or Firm—Joseph W. Malleck; Roger L. May

[57] ABSTRACT

A method is disclosed for joining a molded part to a mating part by use of a self-retained, press-in-place nut that accepts transverse loading. The loaded part is defined to have ribs, each presenting pairs of planar locking surfaces and a side shoulder for transferring side loads. A nut element is formed having a supporting plate and a threaded member; the plate has opposed shoulders to mate with the shoulders of the ribs. Pairs of fingers project from the plane of the plate and toward each other within a pair; the tips of opposed fingers are spaced to be resiliently sprung by the planar surfaces of the rib when the element is wedged thereover. When the nut is pressed-in-place by said wedging with the mating shoulders interengaged, the mating part is fitted to the molded part and a threaded member in the mating part is threadably engaged with the nut permitting transverse loads to be transferred between the parts.

6 Claims, 2 Drawing Figures

METHOD OF JOINING A MOLDED FIRST PART TO A MATING PART CARRYING A FIRST THREAD MEMBER

TECHNICAL FIELD

The invention relates to threaded fasteners which are effective in transmitting structural loads between assembled parts. More particularly, the invention relates to a self-retained, press-in-place, threaded metallic element, such as a nut, which can be quickly installed with access to only one side of a molded part and still provide a strong structural joint when loaded in a transverse direction.

BACKGROUND AND PRIOR ART STATEMENT

Self-retained threaded nuts, which can be installed prior to the insertion of the bolt or stud, have been of the type designed for axial loading only. For example, in U.S. Pat. No. 2,982,989, a flexible metal ply nut is adapted to be squeezed into the hollow stem of a cabinet knob or pull and, upon installation of the threaded fastener, an axial load is applied which straightens or flattens the flexible nut so that its edges will bite into the surrounding metallic wall of the hollow stem and provide a gripping action. The nut is located or centered by the surrounding stem walls bearing against the edges of the ply nut; this is not always a reliable centering mechanism due to the freedom of the nut to skew within the stem. This type of construction is capable of withstanding principally axial loads (that is, loads that are in the direction of the axis of the bolt or threaded stud) and is effective only when working with metallic members which are to be assembled, such as the hollow shank of the knob and the metallic wall of the drawer or door to which the knob is attached.

Similarly, in U.S. Pat. No. 1,547,628, an oversize sheet metal nut is adapted to be squeezed between metallic cast iron lugs that are cast on a cast iron wall, the sheet metal nut then being ready for reception of a threaded fastener when inserted into its central opening. Again the lugs act to hold the outer edges of the nut so that a screw may be torqued therein, but the manner of holding can sometimes lead to mislocation by skewing. The fastener assembly is adapted to withstand axial loading only and will not endure transverse loading because of the flexibility of the nut itself.

In U.S. Pat. No. 971,976, a nut is designed for placement on one of the members of the assembly prior to insertion of the bolt. Two legs or fingers of the nut are inserted through a special shaped hole from one side of the part and staked over the opposite side of the part for retention. Transverse loading must be minimal because the fingers are adapted to engage ceramic sockets which will not withstand great force. The nut itself is not self-retained because it must be held in its turned position while inserting the bolt and threading the bolt therethrough; the nut does not fit securely in one part and can easily be dislodged from its station prior to threading.

What is needed is a nut construction which permits the nut to be easily installed by press-fitting onto planar mating surfaces in a self-retained condition on one of the parts to be assembled, which part can be nonperforated and made of plastic or nonmetal material. The nut should be able to cooperate with the part upon which it is assembled to transmit transverse loading; this is particularly important in assemblies for the automotive industry. The nut should be capable of being quickly installed in a fool-proof manner ready for reception of a threaded male member, the latter typically being carried by the mating part.

SUMMARY OF THE INVENTION

The invention is a method of joining a molded first part to a mating part carrying a first threaded fastening member, the method providing for quick installation of a self-retained complimentary threaded element, which complimentary element is securely installed prior to reception of the first threaded fastening member.

The method comprises the steps of: (a) molding the first part to have integral ribs projecting outwardly from one side thereof, the ribs presenting spaced shoulders along a loading axis and each rib having a pair of planar surfaces aligned with the loading axis; (b) forming an element with a supporting plate and a complimentary threaded member, the plate having opposed shoulders adapted to mate and engage with at least one shoulder of each of the ribs to transfer a transverse load therebetween, the plate also having at least one pair of opposed fingers projecting there, toward each other, with spacing between the tips of the fingers being less than the spacing between the pair of planar surfaces, the fingers being effective to be resiliently sprung to engage with a pair of the planar surfaces; (c) forcing the element over the ribs to wedge the pairs of fingers onto the planar surfaces of the ribs and to mate the shoulders of the plate and ribs; and (d) fitting the mating part to the plastic part and threadably engaging the members carried by each of the parts so that transverse loads may be transferred between the parts.

Preferably, the element is comprised of a metallic stamping with the fingers stamped from the plane of the plate. Preferably, the ribs each have planar locking surfaces biased toward each other to form a wedge.

It is preferable that the parts to be fastened are adapted to serve as a seating construction useful in automotive vehicles. Advantageously, the element is a unitary steel stamping having a plate thickness in the range of 0.04–06 inches (preferably about 0.045 inches), and the threaded member being a threaded socket having an axis extending normal to the plane of the plate and lying on the loading axis.

DETAILED DESCRIPTION AND BEST MODE

Figure 1:
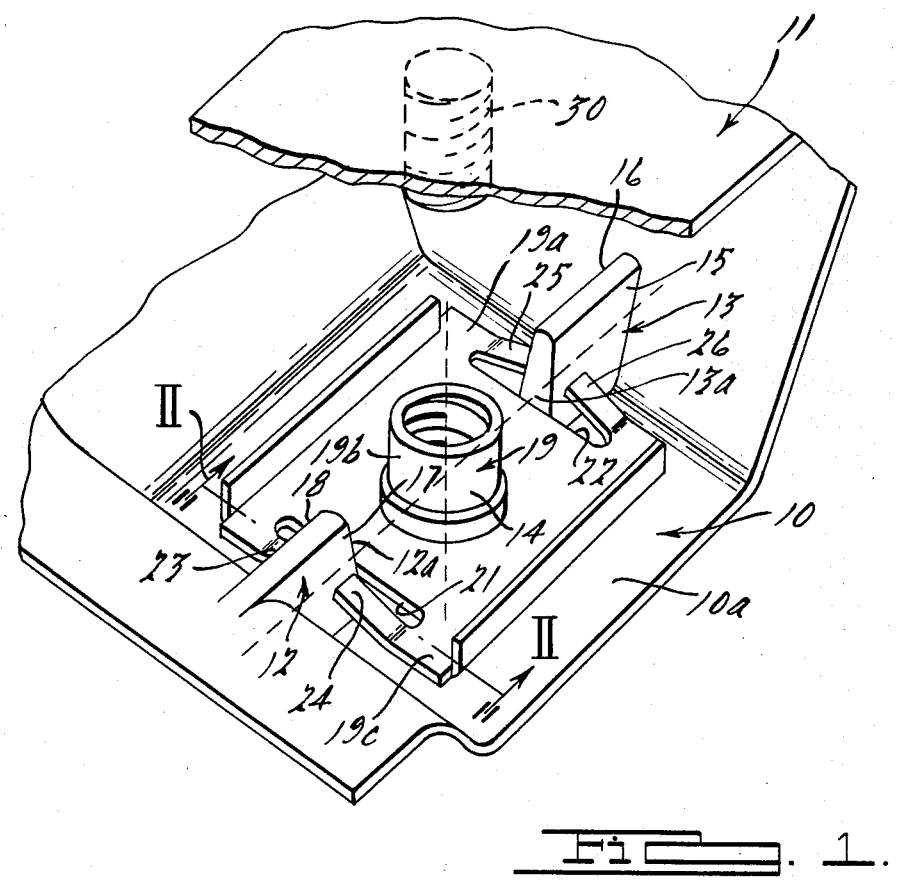
FIG. 1 is a perspective view of a partial assembly put together by the method of this invention and illustrating a molded plastic part with ribs to which a stamped metallic nut element is locked into place prior to threading of the bolt thereto.
Figure 2:
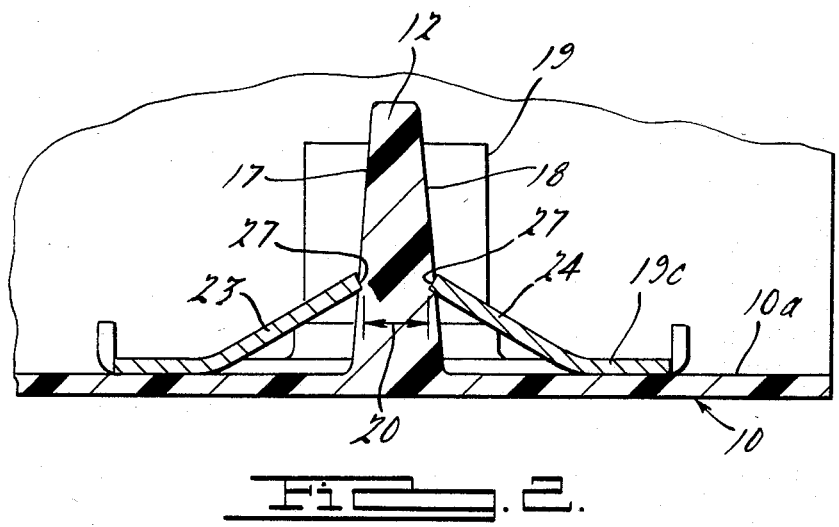
FIG. 2 is an enlarged sectional view of a portion of FIG. 1 taken substantially along the line 2—2 thereof.

As shown in FIG. 1, the parts to be assembled comprise a plastic molded part 10 and a mating part 11. The plastic part is molded to have at least two integral ribs 12 and 13 projecting outwardly from one side 10a of the molded plastic part. Rib 12 has a shoulder 12a and rib 13 has shoulder 13a, which shoulders are spaced apart along a loading axis 14. Each shoulder is defined by a flat end surface of each rib extending generally perpendicular or normal to the wall 10a. Rib 13 has a pair of planar locking surfaces 15 and 16 and rib 12 has a pair of planar surfaces 17 and 18; the planar surfaces are aligned with the loading axis. The planar surfaces are also biased with respect to each other, that is, they taper toward each other the further or remote the surface is from the wall 10a; this is best illustrated in FIG. 2.

An element 19 is formed having a threaded member 19b with an axis 19a carried by a supporting plate 19c. The plate has opposed shoulders 21–22 adapted to mate and engage with the shoulders 12a and 13a of the spaced ribs. The pairs of shoulders, when mated, are effective in transferring loads that are transverse to the axis 19a of the threaded member and along the axis 14. The plate also has two pairs of opposed fingers 23–24 and 25–26 projecting from plate 19c with the fingers of each pair being directed toward each other, as shown in FIGS. 1 and 2. The tips 27 of said pairs of fingers are spaced apart a distance 20, which is less than the thickness of the rib at the position shown in FIG. 2 when the plate 19c is fully seated. The fingers are resilient and are typically stamped to have a bias upwardly, that is, they are bent slightly upwardly out of the plane of the plate 19c (such as 4°-12°) thereby permitting the metallic fastener to be wedged onto the pair of ribs with the fingers sliding along the planar surfaces as the nut is moved downwardly along the planar surfaces. The fingers are dragged and progressively spread further apart during this installation movement because the planar locking surfaces tend to easily spread the fingers further apart. The sprung fingers are capable of spreading apart and sliding over the planar surfaces in one direction (downwardly) but lock or grip the planar surfaces when moved in the other direction (upwardly). When the bottom of the plate is butted or bottomed against the wall 10a, the resilient fingers prevent a withdrawal of the nut because a withdrawal motion would tend to exert a frictional force downwardly on the tips of the fingers causing them to push more securely against the planar locking surfaces of the ribs.

The mating part 11 is fitted to the plastic molded part 10 and the threaded member 30 (bolt) is inserted and threadably secured to the threaded female member 19 of the nut. When the mating threaded members 30 and 19 are threadably secured, loads between the parts can be transferred not only axially but principally in a transverse direction, making it a strong structural joint.

Such a construction is particularly useful in an automotive vehicle seating arrangement where increased amount of plastic molded seating panels are employed of a complex configuration, and it is most important to provide for quick installation using the method of this invention where the threaded nuts can be rigidly secured prior to installation of the mating parts with their threaded studs and with only access to one side of the molded part.

In another application, the molded part may have an opening about which the planar surfaces are located and aligned. Thus, when the nut is wedged in place, a screw may be inserted through the opening in the molded part and thence threadably engage the nut. In this manner, the molded part, and any other assembly carried by the screw, is clamped between the screw head and nut while still accepting transverse loads.

I claim:

1. A method of joining a molded first part to a mating part carrying a first threaded member, the steps comprising:
    (a) molding said first part to have integral ribs projecting outwardly from one side thereof having shoulders spaced apart along a loading axis, each rib having a pair of planar surfaces aligned with said loading axis;
    (b) forming an element with a complimentary threaded member and with a supporting base plate, said base plate having opposed shoulders adapted to mate and engage at least one shoulder of each of said ribs to transfer transverse loads therebetween, said plate also having at least one pair of opposed fingers projecting therefrom, toward each other, with the spacing between the tips of within a pair said fingers within a pair being less than the thickness of said ribs, whereby said at least one pair of fingers is effective to be resiliently sprung to engage with a pair of said planar surfaces permitting movement of the fingers therealong in one direction but preventing movement in an opposite direction;
    (c) forcing said element over said ribs to wedge said at least one pair of fingers onto the planar surfaces of said ribs and mating said shoulders of said plate and ribs; and
    (d) fitting said mating part to said first molded part and fixedly engaging the threaded members carried by each of said parts so that loads may be transferred transversely between said parts.

2. The method as in claim 1, in which each of said ribs have said pairs of planar surfaces formed as wedges with said surfaces biased toward each other in a direction away from the wall of said part from which said ribs project.

3. The method as in claim 2, in which said element is a metallic stamping with fingers stamped from the plane of said plate.

4. The method as in claim 1, in which said parts are portions of a seating construction for automotive vehicle use.

5. The method as in claim 1, in which said element is a unitary metallic stamping having a thickness 0.04–0.06 inches, and having the fingers thereof bent outwardly from the plane thereof at an angle in the range of 4°-12°.

6. The method as in claim 1, in which said fastener has a threaded socket with an axis thereof located along the transverse loading axis and extending normal to the plane of said plate.

* * * * *